United States Patent
Li et al.

(10) Patent No.: US 9,826,339 B2
(45) Date of Patent: *Nov. 21, 2017

(54) DATA COMMUNICATION WITH LOW-ENERGY DEVICES

(71) Applicant: International Business Machines Corporation, Armonk, NY (US)

(72) Inventors: Yu Bo Li, Beijing (CN); Tian Cheng Liu, Beijing (CN); Ke Wei Sun, Beijing (CN); Chao Xue, Beijing (CN); Boa Hua Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/745,490

(22) Filed: Jun. 22, 2015

(65) Prior Publication Data

US 2016/0345122 A1    Nov. 24, 2016

Related U.S. Application Data

(63) Continuation of application No. 14/714,522, filed on May 18, 2015.

(51) Int. Cl.
*H04W 4/00* (2009.01)
*H04W 8/22* (2009.01)
(Continued)

(52) U.S. Cl.
CPC ............ *H04W 4/008* (2013.01); *H04W 8/22* (2013.01); *H04W 52/0222* (2013.01);
(Continued)

(58) Field of Classification Search
CPC ............ H04W 4/008; H04W 52/0222; H04W 84/18; H04W 8/22; H04W 48/02; H04W 48/16; H04W 48/20; H04W 8/26
See application file for complete search history.

(56) References Cited

U.S. PATENT DOCUMENTS

| | | | |
|---|---|---|---|
| 9,491,691 B2 * | 11/2016 | Tailor | H04W 48/16 |
| 2014/0244167 A1 * | 8/2014 | Reynolds | H04W 64/00 |
| | | | 701/518 |

(Continued)

OTHER PUBLICATIONS

List of IBM Patents or Patent Applications Treated as Related; (Appendix P), Filed Aug. 22, 2015; 2 pages.

(Continued)

*Primary Examiner* — Ian N Moore
*Assistant Examiner* — Mewale Ambaye
(74) *Attorney, Agent, or Firm* — Cantor Colburn LLP; Keivan Razavi (57) ABSTRACT

In one embodiment, a system includes a first tracked device and a second tracked device. The first tracked device includes first known device data, describing one or more previous connections known to the first tracked device. The second tracked device includes second known device data, describing one or more previous connections known to the second tracked device. The first tracked device is configured to connect to the second tracked device, transfer to the second tracked device at least a portion of the first known device data, and receive from the second tracked device at least a portion of the second known device data. The first tracked device is further configured to modify the first known device data to incorporate the second known device data. The second known device data includes data related to a previous connection involving a third tracked device outside a signal range of the first tracked device.

4 Claims, 4 Drawing Sheets

(51) Int. Cl.
*H04W 52/02* (2009.01)
*H04W 84/18* (2009.01)
*H04W 48/16* (2009.01)
*H04W 8/26* (2009.01)
*H04W 48/20* (2009.01)

(52) U.S. Cl.
CPC .............. *H04W 8/26* (2013.01); *H04W 48/16* (2013.01); *H04W 48/20* (2013.01); *H04W 84/18* (2013.01); *Y02B 60/50* (2013.01)

(56) References Cited

U.S. PATENT DOCUMENTS

2014/0355517 A1* 12/2014 Reunamaki ........... H04W 8/005
   370/328
2015/0271629 A1* 9/2015 Knaappila ............. H04W 8/005
   455/41.2
2015/0289124 A1* 10/2015 Palin .................... H04W 8/005
   455/41.2
2016/0295358 A1* 10/2016 Cariss .................. H04W 4/008

OTHER PUBLICATIONS

Yu Bo Li, et al., "Data Communication With Low-Energy Devices", U.S. Appl. No. 14/714,522, filed May 18, 2015.

\* cited by examiner

DATA COMMUNICATION WITH LOW-ENERGY DEVICES

DOMESTIC PRIORITY

This application is a continuation of U.S. patent application Ser. No. 14/714,522, filed May 18, 2015, the disclosure of which is incorporated by reference herein in its entirety.

BACKGROUND

Various embodiments of this disclosure relate to low-energy devices and, more particularly, to data communication with low-energy devices.

From an information technology perspective, machines, people, peripheral devices, and other entities can all be assets. Near-field communication (NFC), such as radio-frequency identification (RFID), is commonly used to track these assets for the purpose of asset management. RFID tags are generally low cost, making them convenient and efficient for massive deployment. However, given the short range, when using RFID tags, an asset manager must get close to each asset to collect any necessary data. For instance, for passive RFID tags, the range is generally limited to ten to fifty centimeters. Thus, collecting asset information leads to a high degree of error, especially in complicated data center environments. Further, in a dangerous environment, such as a coalmine, it may be nearly impossible for the asset manager to get physically close enough to each asset to acquire necessary asset information.

As chips become cheaper, more long-range technologies are used for asset management. These technologies include WiFi, ZigBee, and wireless serial devices. Devices with these technologies can be expensive to manufacture and consume a high amount of power. Further, each such device requires a processor, such as a microcontroller unit (MCU) or central processing unit (CPU). These processors need more power than a common battery to support steady and continuous running for months or years. Thus, implementation of these long-range technologies may require a power supply, which may be problematic for practical deployment.

Bluetooth Low Energy (BLE) is an emerging energy-efficient technology. BLE devices are power efficient with low-cost and easily replaceable batteries. However, these devices are able to pair with only a single other BLE device at a time and, thus, cannot support networks with N-to-N transmissions.

The traditional Bluetooth protocol supports both piconet and scatternet, but both of these have limitations. In piconet, a master node can connect to no more than seven slaves in its short communication range. In scatternet, a slave node acts as a bridge between piconets to communicate between the piconets. To this end, the slave node must stay within range of both piconets and support communications in the corresponding frequency channels.

SUMMARY

In one embodiment of this disclosure, a system includes a first tracked device and a second tracked device. The first tracked device includes first known device data, where the first known device data describes one or more previous connections known to the first tracked device. The second tracked device includes second known device data, where the second known device data describes one or more previous connections known to the second tracked device. The first tracked device is configured to connect to the second tracked device, transfer to the second tracked device at least a portion of the first known device data, and receive from the second tracked device at least a portion of the second known device data. The first tracked device is further configured to modify the first known device data to incorporate the second known device data. The second known device data includes data related to a previous connection involving a third tracked device outside a signal range of the first tracked device.

In another embodiment, a computer-implemented method includes connecting a first tracked device to a second tracked device. The first tracked device includes first known device data, and the second tracked device includes second known device data. At least a portion of the first known device data is transferred from the first tracked device to the second tracked device, where the first known device data describes one or more previous connections known to the first tracked device. At least a portion of the second known device data is received at the first tracked device from the second tracked device, where the second known device data describes one or more previous connections known to the second tracked device. The first known device data of the first tracked device is modified to incorporate the second known device data. The second known device data includes data related to a previous connection involving a third tracked device outside a signal range of the first tracked device.

In yet another embodiment, a computer program product for communicating data among tracked devices includes a computer readable storage medium having program instructions embodied therewith. The program instructions are executable by a processor to cause the processor to perform a method. The method includes connecting a first tracked device to a second tracked device. The first tracked device includes first known device data, and the second tracked device includes second known device data. Further according to the method, at least a portion of the first known device data is transferred from the first tracked device to the second tracked device, where the first known device data describes one or more previous connections known to the first tracked device. At least a portion of the second known device data is received at the first tracked device from the second tracked device, where the second known device data describes one or more previous connections known to the second tracked device. The first known device data of the first tracked device is modified to incorporate the second known device data. The second known device data includes data related to a previous connection involving a third tracked device outside a signal range of the first tracked device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure enable tracked devices, such as Bluetooth Low Energy (BLE) devices, to communicate information between one another through an ad-hoc network. Although BLE devices are cost-effective and energy-efficient, conventional uses of them provide only limited ad-hoc capabilities, in part due to the short range of these devices. Through embodiments of this disclosure, however, information may be transmitted across a distance that is larger than each device's signal coverage.

Figure 1:
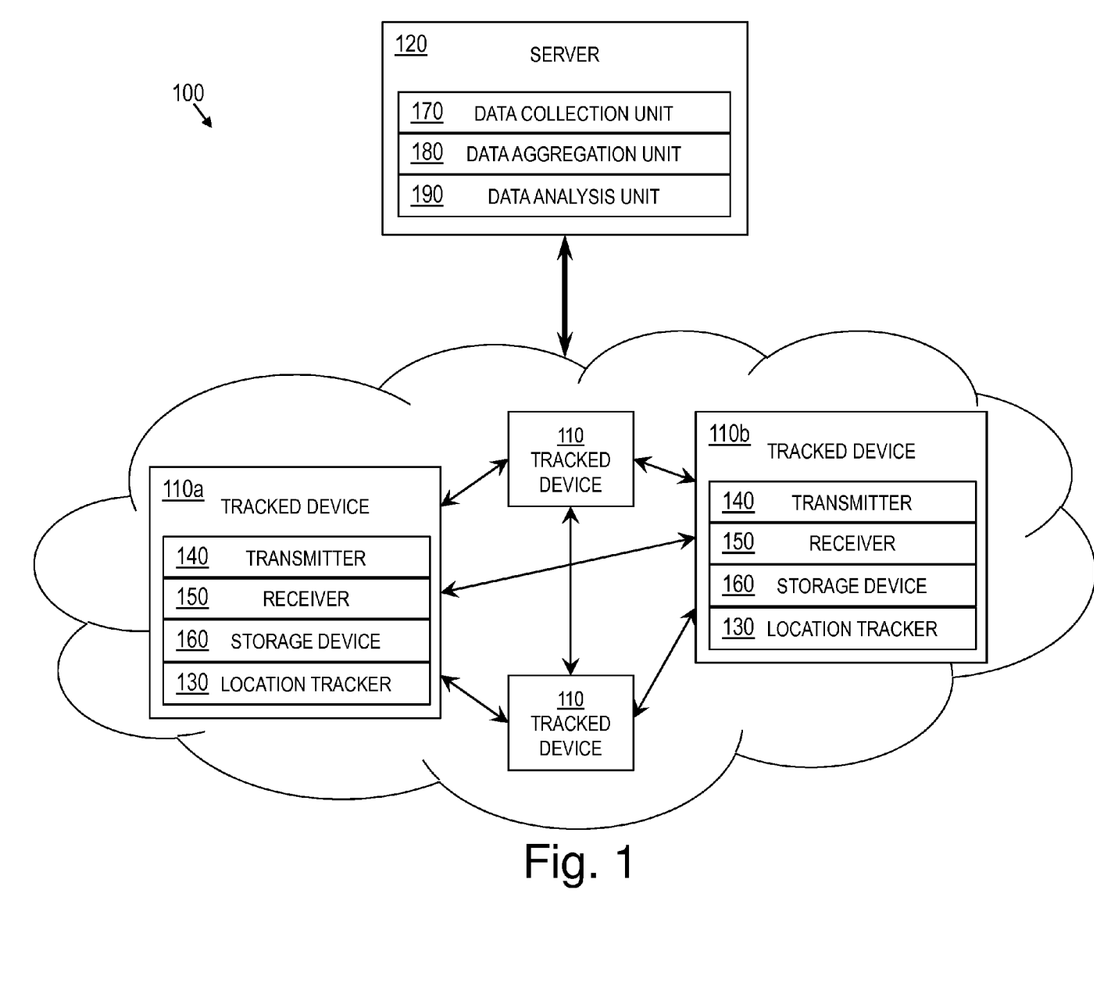
FIG. 1 is a block diagram of a communication system, according to some embodiments of this disclosure.

FIG. 1 is a block diagram of a communication system 100, according to some embodiments of this disclosure. As shown, the communication system 100 may include two or more tracked devices 110 and a server 120. Each tracked device 110 may be, for example, a BLE device or other energy-efficient Bluetooth device or communication device. In some embodiments, a tracked device 110 may be attached to or carried by an asset, such as a person or equipment, so as to enable tracking of the asset itself. Together, the tracked devices 110 may form an ad-hoc network, with each one transmitting information to its neighbors. As a result, the server 120 may be made aware of the status of the various tracked devices 110, and to this end, the server 120 need not directly communicate with each individual tracked device 110.

Each tracked device 110 may include various components, including a transmitter 140, a receiver 150, and a storage device 160. More specifically, for a tracked device 110 that is a BLE device, the transmitter 140 may be a BLE peripheral module, the receiver 150 may be a BLE central module, and the storage device 160 may use flash storage. In some embodiments, one or more of the tracked devices 110 may also include a location tracker 130, such as a GPS device.

Throughout this disclosure, for the sake of illustration, a first tracked device 110a and a second tracked device 110b will be referenced from among the various tracked devices 110. It will be understood that the first and second tracked devices 110a and 110b are examples of the various tracked devices 110. Thus, the first and second tracked devices 110a and 110b may be similar to the other tracked devices 110, and may include the same or similar hardware or software components. It will be further understood that each of the tracked devices 110 may behave in the same manner as the first and second tracked devices 110a and 110b, and may include the same functionalities. As a result, the various tracked devices 110 may communicate among one another in the same manner or a similar manner to which the first and second tracked devices 110a and 110b communicate with other tracked devices 110.

In the storage device 160, a first tracked device 110a may maintain known device data. The known device data may include data related to known tracked devices 110, which are tracked devices 110 about which the first tracked device 110a has information. For each known tracked device 110, the known device data maintained by the first tracked device 110a may include a record associated with the known tracked device 110. The record may include, for example, a universally unique identifier (UUID) for the known tracked device 110, a group identifier for the known tracked device 110, and one or more record lines, where each record line may describe a previous connection of the known tracked device 110. For example, and not by way of limitation, each record line of the record may include a connection timestamp, a connection location, a connection timeout, and a connection device. The connection timestamp may specify when the known tracked device 110 connected to the particular tracked device 110 specified as the connection device, and the connection timeout may specify how long the connection lasted. If the known tracked device 110 has a location tracker 130, the connection location may indicate the location of the known tracked device 110 at the time of the connection recorded in the record line.

The various tracked devices 110 may connect to one another to exchange known device data. Before an exchange can take place between the first tracked device 110a and a second tracked device 110b, the two tracked devices 110a and 110b may first connect to each other. In some embodiments, a tracked device 110 can connect to only a single other tracked device 110 at a time. Thus, each tracked device 110 may connect one at a time to a series of other tracked devices 110.

When available for a connection, a tracked device 110 may be in one of its available connection modes, which may include advertiser mode and initiator mode. In advertiser mode, a tracked device 110 may broadcast information about itself, such as its UUID. In some embodiments, this broadcasting may be performed by the transmitter 140. In initiator mode, a tracked device 110 may listen to broadcasts and initiate a connection with a tracked device 110 in advertiser mode. In some embodiments, the listening may be performed by the receiver 150. If the first tracked device 110a is in initiator mode and the second tracked device 110b is in advertiser mode, the first tracked device 110a may thus receive the second tracked device's broadcast and may initiate a connection, or a pairing, with the second tracked device 110b. In some embodiments, a connection may be a master-slave relationship, in which the tracked device 110 that was in initiator mode becomes the master and directs the exchange of data with the other tracked device 110, which behaves as the slave.

In some embodiments, each tracked device 110 may be in either advertiser mode or initiator mode at a given time, but may not be in both at once. As a result, there may be instances when tracked devices 110 within range of each other do not communicate because both are in the same mode. Thus, the communication system 100 may ensure that each tracked device 110 switches back and forth between advertiser mode and initiator mode. In this way, the communication system 100 may improve the amount of data gathered by the tracked devices 110 and passed along to the server 120, as compared to locking each tracked device 110 into a single mode.

The tracked devices 110 may use various mechanisms for timing their switches between modes. For example, a tracked device 110 may randomly switch back and forth between advertiser mode and initiator mode. For another example, the tracked device 110 may modify the duration in which it is in one mode or the other based on how many connections it was able to make during previous periods in each mode. For instance, if the tracked device 110 deems that it makes more connections when in advertiser mode, it may increase the length of its advertiser mode and shorten the length of its initiator mode. For yet another example, the tracked device 110 may determine the length of its modes by probability, based on historical connections. In this example, the length of each mode may correspond to the probability that it will have more opportunities for connections in that mode rather than the other mode.

In some instances, a collision may occur. In a collision, the first tracked device 110a may have an opportunity to connect to two or more other tracked devices 110 at the same time. If the first tracked device 110a is in advertiser mode, this may occur when the first tracked device 110a detects two or more other tracked devices 110 within range. If the first tracked device 110a in initiator mode, this may occur when two or more tracked devices 110 attempt to initiate a connection at the same time. When a collision occurs, the first tracked device 110a with two or more opportunities to connect may select one of the available tracked devices 110 with which to make a connection. This selection may be made through various mechanisms. For example, the first tracked device 110a may randomly select from among the available tracked devices 110, or may select the tracked device 110 to which it was least recently connected.

While connected, two tracked devices 110 may exchange their known device data. In other words, if the first and second tracked devices 110a and 110b are connected, the first tracked device 110 may transmit its known device data to the second tracked device 110, which may receive that known device data. Similarly, the second tracked device 110 may transmit its known device data to the first tracked device 110, which may receive that known device data. Each of the connected first and second tracked devices 110a and 110b may combine the received known device data with its existing known device data, which may include adding the received known device data to the existing known device data. As a result, after the exchange takes place, each of the first and second tracked device 110a and 110b in the connection may have a copy of the previous known device data of the other tracked device 110.

In some cases, the known device data received by the first tracked device 110a may include data related to other tracked devices 110 already known to the first tracked device 110a. In other words, the first tracked device 110a may already have data related to another tracked device 110 described in the received known device data. In these cases, combining the received known device data with the existing known device data may include consolidating records in the known device data and the received known device data, where the consolidation may be based on UUIDs. For example, if the first tracked device 110a has known device data that includes a record for a known tracked device 110 with a first UUID, and if that tracked device 110 receives known device data including a record for the known tracked device 110 with the first UUID, the tracked device 110 may consolidate those two records. This consolidation may include combining the record lines of the record in the known device data and the record in the received known device data, and removing any duplicate lines.

When two tracked devices 110 connect, they may check their known device data to determine whether they have previously connected. If they determine that they have previously connected, one or both tracked devices 110 may decide how much of their known device data to exchange. Due to the previous connection, it can be expected that the tracked devices 110 have overlapping known device data, because they exchanged known device data during their previous connection. In some embodiments, the tracked devices 110 may simply exchange their entire known device data. In some other embodiments, however, each tracked device 110 may examine the record related to the other tracked device 110 in its own known device data to determine the last time it connected to the other tracked device 110. Then the tracked device 110 may then exchange only the known device data received after that last connection time. For instance, if the first and second tracked devices 110a and 110b connect after a prior connection, the first tracked device 110a may examine its known device data to determine when it last connected to the second tracked device 110b, and may transmit to the second tracked device 110b only the records that have been updated (e.g., added or modified) after the previous connection time.

In addition to exchanging known device data during a connection, the first and second tracked devices 110a and 110b may each add a record line representing the connection to each other. More specifically, for example, if the first tracked device 110a has no existing record for the second tracked device 110b in its known device data, the first tracked device 110a may add a new record, which may include a new record line representing the connection to the second tracked device 110b. If the first tracked device 110a already has a record for the second tracked device 110b upon making the connection, the first tracked device 110a may modify this existing record by adding the new record line to represent the connection. Regardless of whether a previous connection occurred, the new record line in the known device data of the first tracked device 110a may include a connection timestamp and a UUID of the second tracked device 110b. In some embodiments, this new record line may be added or modified after the connection between the first and second tracked devices 110a and 110b has ended. In that case, the record line may further include a connection timeout, which may indicate the duration of the connection.

Figure 2:
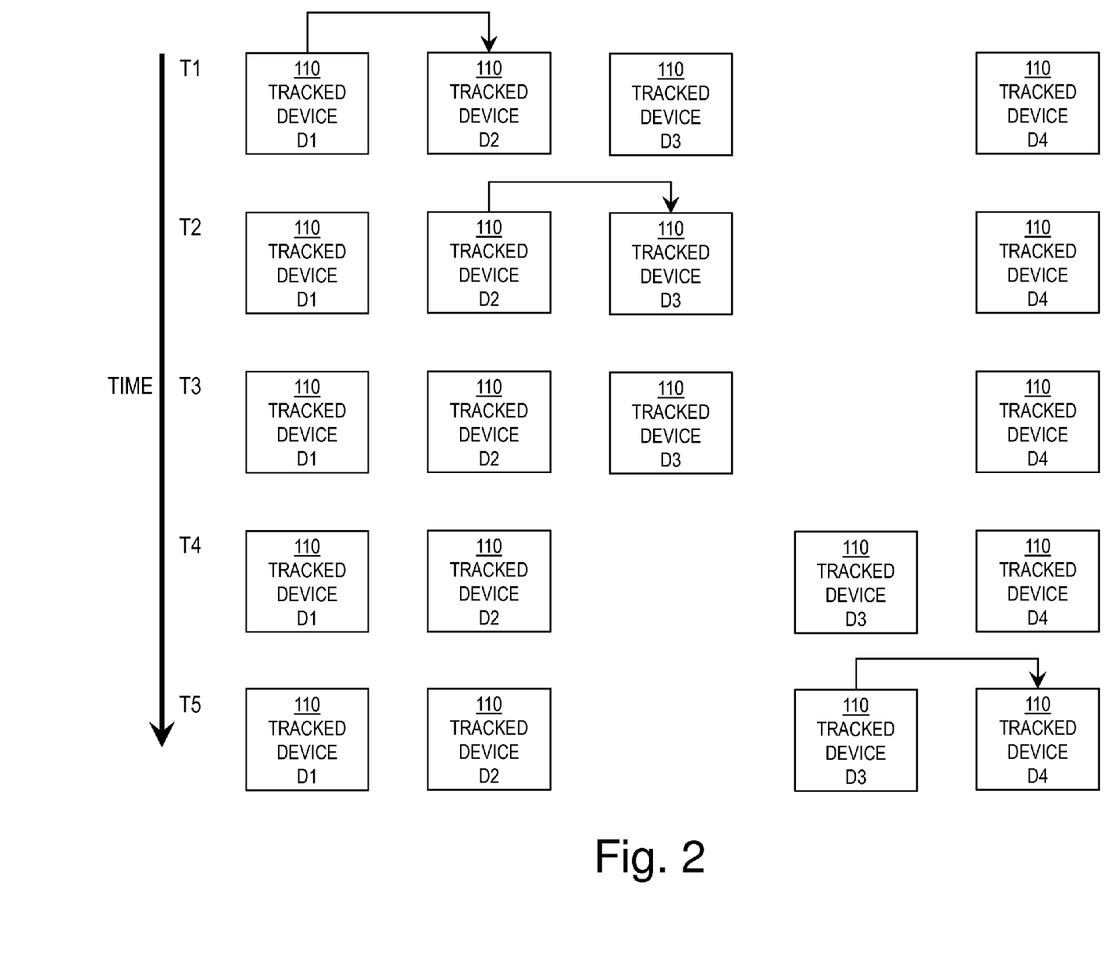
FIG. 2 is a block diagram of example communications in the communication system, according to some embodiments of this disclosure.

FIG. 2 is a diagram of example communications in the communication system 100, according to some embodiments. More specifically, FIG. 2 illustrates an example of data exchanges between tracked devices 110 over a span of time from time T1 to time T5. This example involves tracked devices D1, D2, D3, and D4. At the beginning of this example, these tracked devices 110 each have an initial set of known device data. Specifically, D1 has known device data KD1; D2 has known device data KD2; D3 has known device data KD3; and D4 has known device data KD4.

At time T1, tracked device D1 pairs with tracked device D2, and D1 and D2 exchange known device data. After the exchange, each of D1 and D2 have known device data KD1 and KD2. At time T2, tracked device D2 pairs with tracked device D3, and D2 and D3 exchange known device data. Specifically, tracked device D2 transmits known device data KD1 and KD2 to D3, and tracked device D3 transmits known device data KD3 to D2. After the exchange, each of D2 and D3 have known device data KD1, KD2, and KD3. At time T3, no connections or exchanges are made. At time T4, tracked device D3 moves into the range of tracked device D4. At time T5, tracked device D3 pairs with tracked device D4, and the two exchange known device data. Specifically, tracked device D3 transmits known device data KD1, KD2, and KD3 to D4, and tracked device D4 transmits known device data KD4 to D3. After the exchange, each of D3 and D4 have known device data KD1, KD2, KD3, KD4. As shown in this example, tracked device KD4 is able to obtain known device data from three other tracked devices 110 by connecting to only one other tracked device 110. Further, if either of tracked device D3 or D4 were to connect to the server 120 and transmit known device data to the server 120, the server 120 may then receive the known device data initially maintained by all four tracked devices 120 combined.

Each tracked device 110 may have a short range (e.g., thirty feet). Due to the various connections made between the tracked devices 110 in the communication system 100, each tracked device 110 may have records related to one or more other tracked devices 110 in its known device data. One or more of the tracked devices 110 may be in range of the server 120, which may seek information about as many of the tracked devices as possible 110. When a tracked device 110 connects to the server 120, the tracked device 110 may transmit its known device data to the server 120. In some embodiments, the server 120 may thus receive 110 known device data from one or more of the tracked devices 110, and that received known device data may include records related to one or more tracked devices 110. As a result, the server 120 may receive records related to tracked devices 110 for which the server 120 is out of range.

As shown in FIG. 1, the server 120 may include a data collection unit 170, a data aggregation unit 180, and a data analysis unit 190, each of which may be include hardware, software, or a combination of both. Although the data collection unit 170, the data aggregation unit 180, and the data analysis unit 190 are illustrated in FIG. 1 as being separate components, it will be understood that these units 170, 180, and 190 may include overlapping hardware, software, or both, or may be further divided based on implementation.

The data collection unit 170 may receive known device data from the tracked devices 110 and may store the received known device data in local storage or in some other storage device accessible by the sever 120. The data aggregation unit 180 may extract from the known device data each tracked device's location at each time that tracked device 110 made a connection. From the extracted locations, the data analysis unit 190 may determine more accurate location data for each tracked device 110. It may be the case that some information in the known device data is incorrect or absent with respect to locations of tracked devices 110. Incorrect location data may be recorded, for example, if a tracked device's location tracker 130 malfunctioned. It may also be the case that one or more tracked devices 110 lack location trackers 130. In that case, the locations of such tracked devices 110 may be determined based on the locations of tracked devices 110 to which they connected. By analyzing the known device data, the server 120 may drop or modify location data that appears incorrect, and may add location data where applicable. In some embodiments, for example, the data analysis unit 190 may generate a footprint, such as a heat map, for each tracked device 110. The footprint may be a chart representing the tracked device's location over time. In some embodiments, the footprint may be output to a user of the communication system 100 for manual review or analysis.

Figure 3:
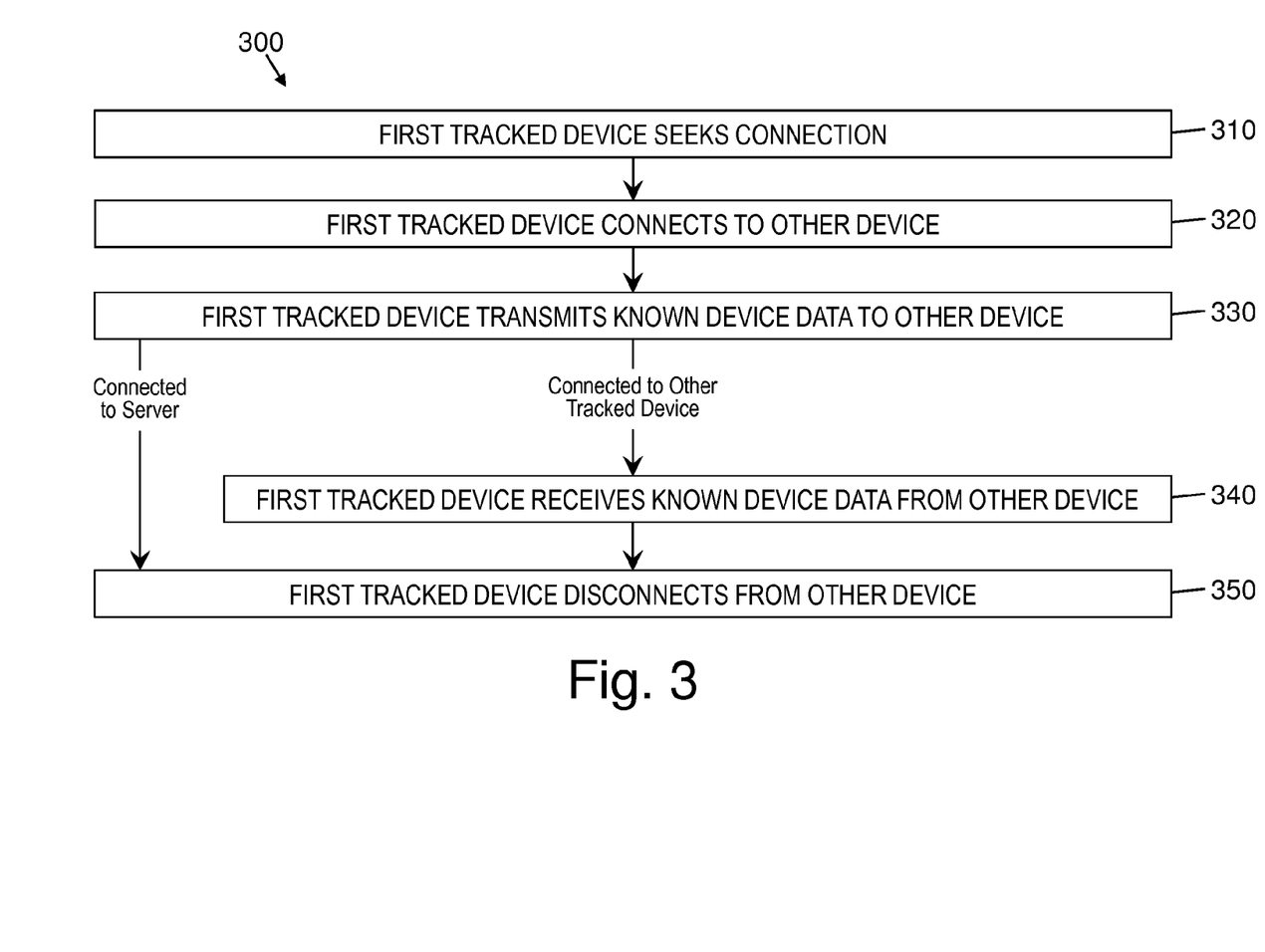
FIG. 3 is a flow diagram of a method of communicating data in the communication system, according to some embodiments of this disclosure.

FIG. 3 is a flow diagram of a method 300 for communicating data, according to some embodiments of this disclosure. As shown, at block 310, a first tracked device 110a may seek a connection, either by broadcasting its UUID in advertiser mode or by listening for broadcasts in initiator mode. In some embodiments, seeking a connection may include occasionally switching back and forth between advertiser mode and initiator mode. At block 320, the first tracked device 110a may connect to another device. At block 330, the first tracked device may transmit its known device data to the connected device. If the connected device is another tracked device 110, then at block 340, the first tracked device 110 may receive known device data from the other tracked device 110. At block 350, the first tracked device 110 may disconnect, and the method 300 may return to block 310 to await another connection.

Figure 4:
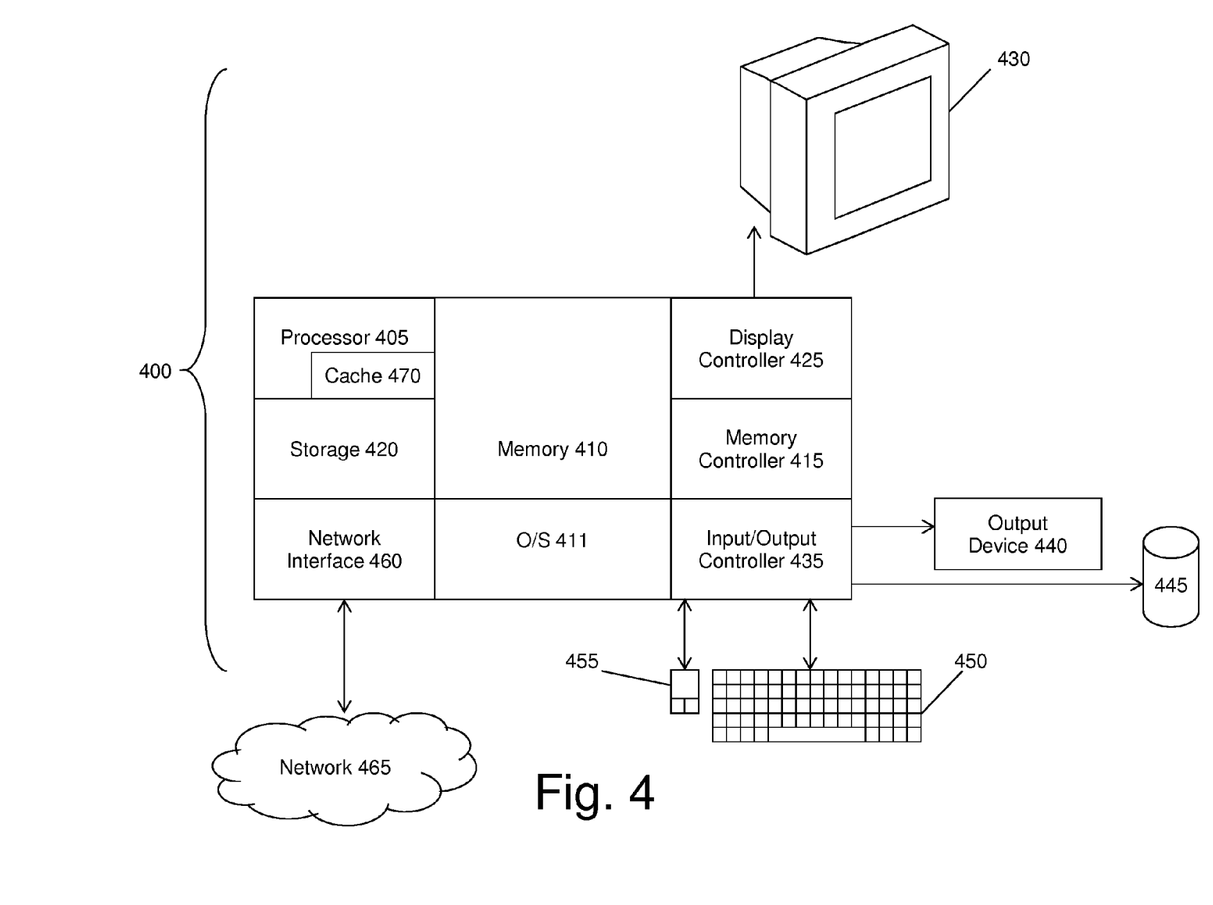
FIG. 4 is a block diagram of a computing device for implementing some or all aspects of the communication system, according to some embodiments of this disclosure.

FIG. 4 illustrates a block diagram of a computer system 400 for use in implementing a communication system 100 or method according to some embodiments. For example, the server 120 or a tracked device 110 may be a computer system 400 such as the one illustrated in FIG. 4. The communication systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a mobile device, personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the communication systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as Bluetooth, NFC technologies, WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Communication systems 100 and methods according to this disclosure may be embodied, in whole or in part, in computer program products or in computer systems 400, such as that illustrated in FIG. 4.

Technical effects and benefits of some embodiments include the ability to communicate information among tracked devices 110 and a server 120, such that the server 120 may receive information about tracked devices 110 outside its range. Some embodiments of the communication system 100 may thus enable use of low-cost and low-power devices, such as BLE devices, while effectively extending the range of these devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
connecting to one another a plurality of tracked devices, each tracked device of the plurality of tracked devices configured to track a status of a respective asset of a plurality of assets, and each tracked device of the plurality of tracked devices comprising respective known device data describing at least one or more previous connections of the tracked device;
switching, by a first tracked device, periodically between a first connection mode and a second connection mode, wherein the switching is configured to increase a count of connections made by the first tracked device;
connecting the first tracked device of a plurality of tracked devices to a second tracked device of the plurality of tracked devices, wherein each tracked device of the plurality of tracked devices is configured to track a status of a respective asset of a plurality of assets, and wherein each tracked device of the plurality of tracked devices comprises respective known device data describing at least one or more previous connections of the tracked device;
wherein the first tracked device is configured to track a status of a first asset of the plurality of assets, and wherein the first tracked device comprises first known device data describing at least one or more previous connections of the first tracked device;
wherein the second tracked device is configured to track a status of a second asset of the plurality of assets, and wherein the second tracked device comprises second known device data describing at least one or more previous connections of the second tracked device, and wherein the second known device data comprises third known device data received by the second tracked device from a third tracked device of the plurality of tracked devices and describing at least one or more previous connections of the third tracked device;
transferring, from the first tracked device to the second tracked device, the first known device data;
receiving, at the first tracked device from the second tracked device, the second known device data; and
transferring, from the first tracked device to a server, the second known device data received from the second tracked device and describing at least the one or more previous connections of the second tracked device and the one or more previous connections of the third tracked device;
wherein the server is outside a transmission range of at least a portion of the plurality of tracked devices, wherein the server is outside the transmission range of the second tracked device, and wherein the server is configured to receive the respective known device data of the at least a portion of the plurality of tracked devices of which the server is outside the transmission range; and wherein the server is configured to perform analysis on the first known device data and additional known device data, and wherein the server is further configured to correct location data in the first known device data based on the analysis.

2. The method of claim 1, wherein the first connection mode is an advertiser mode, and wherein the second connection mode is an initiator mode.

3. The method of claim 1, wherein the first known device data comprises a plurality of records, the method further comprising:

identifying a record in the first known device data describing an other previous connection between the first tracked device and the second tracked device;

determining from the record a time of the other previous connection between the first tracked device and the second tracked device;

wherein transferring the at least a portion of the first known device data comprises selecting for transfer a portion of the known device data that was updated after the time of the other previous connection.

4. The method of claim 1, further comprising consolidating a first record of the first known device data and a second record of the second known device data, based on a common tracked-device identifier in the first record and the second record.

* * * * *